Aug. 2, 1960 O. THIEL 2,947,122
ADJUSTABLE SPINDLE FOR BUFFING WHEELS AND THE LIKE
Filed Aug. 18, 1958 6 Sheets-Sheet 1

FIG.1.

INVENTOR.
OTTO THIEL
BY Whittemore Hulbert
Belknap
ATTORNEYS

Aug. 2, 1960     O. THIEL     2,947,122
ADJUSTABLE SPINDLE FOR BUFFING WHEELS AND THE LIKE
Filed Aug. 18, 1958     6 Sheets-Sheet 2

INVENTOR.
OTTO THIEL
ATTORNEYS

Aug. 2, 1960    O. THIEL    2,947,122
ADJUSTABLE SPINDLE FOR BUFFING WHEELS AND THE LIKE
Filed Aug. 18, 1958    6 Sheets-Sheet 5

FIG.7.

INVENTOR.
OTTO THIEL
ATTORNEYS

Aug. 2, 1960  O. THIEL  2,947,122
ADJUSTABLE SPINDLE FOR BUFFING WHEELS AND THE LIKE
Filed Aug. 18, 1958  6 Sheets-Sheet 6

INVENTOR.
OTTO THIEL
BY Whittemore, Hulbert &
Belknap
ATTORNEYS

United States Patent Office 2,947,122
Patented Aug. 2, 1960

2,947,122

ADJUSTABLE SPINDLE FOR BUFFING WHEELS AND THE LIKE

Otto Thiel, Detroit, Mich., assignor to Midwest Supply and Manufacturing Company, Ferndale, Mich., a corporation of Michigan Filed Aug. 18, 1958, Ser. No. 755,620

10 Claims. (Cl. 51—166)

The present invention relates to improvements in industrial buffing wheels, and more particularly to improvements whereby the buffing wheel spindle is made widely and universally adjustable, thereby to accommodate the wheel to operate on a wide variety of types of work, positioned variously relative to the supporting structure for the wheel spindle.

It is an object of the invention to provide improved structure for supporting a buffing wheel, whether from an overhead location or upon a suitable upright standard, in such a way as to enable the wheel to be adjusted to any possible position required by the character of the work, its position or inclination relative to the spindle axis of the buffing wheel, the nature of the work surfaces, and the like.

These provisions include means for adjusting the spindle axis vertically, for example, to adjust for wear of the wheel buff or to operate on work surfaces at different elevations. To this end, the supporting structure includes novel and improved provisions to adjust a column-type support for the buffing wheel head, thereby bodily varying the height of the head, and also to adjust the vertical position of the wheel head in relation to such column support. Coupled with this, the invention affords improved means for rotatably adjusting the buffing wheel head in relation to its support, in both the vertical and horizontal senses.

It is a further object of the invention to provide an adjustable buffing wheel spindle support, in which the provisions for rotatively adjusting the buffing wheel head include means for pivoting the head structure on a column-type support, sustained either from above or from beneath, for rotation in one direction, for example, vertically, and for adjustably pivoting the head on this pivotally mounted member for adjustment in the opposite sense, for example, horizontally. There is thus provided a universal mount for the buffing wheel spindle which will permit the buffing wheel to operate on work at either side of the head support, or in between these positions, and with its axis disposed either vertically or horizontally, or at an intermediate angle.

Another object is to provide an adjustable spindle structure of this sort, in which the buffing wheel head includes a rigid bracket mounted for universal-type adjustment as described, and in which a spindle housing is pivotally mounted in an improved manner on said bracket, for controlled floating movement relative to the latter, and to the work.

A further object is to provide such spindle structure in which the spindle housing is itself adjustable 360° in relation to the bracket on which it is carried for floating movement.

Yet another object is to provide fully adjustable spindle structure as described, in which the bracket referred to in the preceding paragraphs includes a slide adjustably mounted upon the compounds horizontally and vertically pivoting provisions described, this slide being equipped with means for longitudinally adjusting the same in the direction to and from the work, all for the purpose of adjusting for wear of the buffing wheel.

A still further object is to provide adjustable spindle supporting means as referred to above, in which the buffing wheel mounting bracket is provided with combined spring and air cylinder means to counter-balance its weight or to urge it against the work, depending upon the adjusted position of the bracket and buffing wheel relative to the work.

In general, it is an object to provide heavy duty buffing apparatus which is universally adjustable in a quick and easy fashion to change over from one type of buffing operation to another, so that a minimum of productive time and labor is wasted in the changeover; in which the provisions to this end are very simple but rugged and relatively inexpensive; and in which, furthermore, the equipment occupies a minimum of floor space and is fully accessible from all sides for the purpose of making the desired adjustments.

The foregoing as well as other objects will become more apparent as this description proceeds, especially when considered in connection with the accompanying drawings illustrating preferred embodiments of the invention, wherein.

Figure 1:
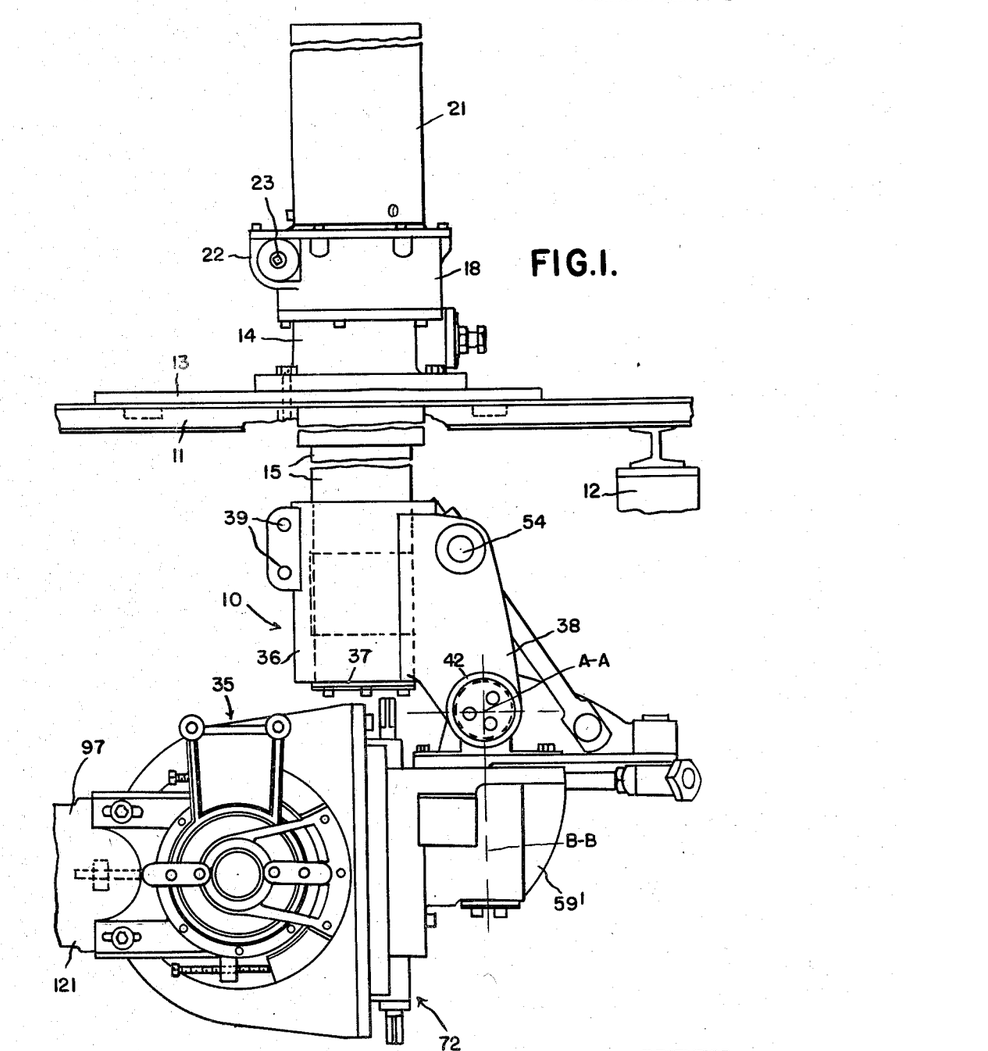
Fig. 1 is a fragmentary view in end elevation, partially broken away, illustrating the improved equipment in an embodiment wherein the buffing wheel head is supported from an overhead location.

Referring first to Fig. 1 of the drawings, a buffing machine 10 provided with the improvements of the invention is shown as a type having an overhead support in the interest of conserving floor space. This support may include a suitable cross beam structure 11 resting on spaced upright pillars 12. An appropriate base plate 13 sustains a tubular shaft housing 14 on the beam structure 11, this housing including a sleeve-like portion extending downwardly through an opening in the plate 13.

An upright tubular shaft or column 15 of substantial length is mounted for sliding movement within the housing 14, and this column is provided with a suitable thread 16 along its length. It is also provided with an elongated spline, keyway or axial groove 17 of truncated V-shape in cross section on its exteror.

A hollow gear housing 18 is bolted onto the top of the shaft housing 14 (Figs. 2, 3 and 4), and a worm gear 19 is rotatable in the housing coaxially of the axis of tubular shaft or column 15, being internally threaded to engage the thread 16 of the column. The gear 19 rests on and has slidable rotative engagement with the horizontal floor of gear housing 18, and rotation of the worm gear 19 causes the column 15 to move axially upwardly and downwardly in its housing 14, as indicated in dotted line in Fig. 4.

Figure 2:
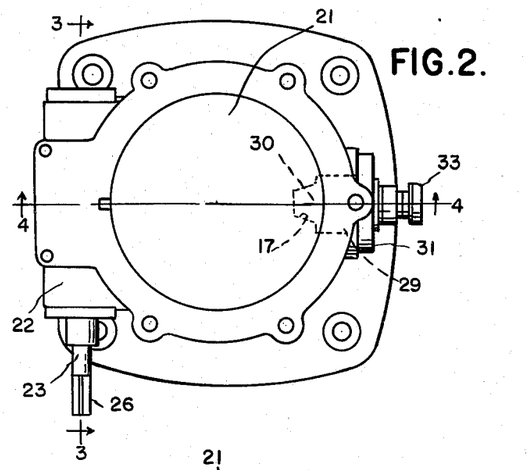
Fig. 2 is a top plan view of the supporting column structure of the improved equipment.
Figure 3:
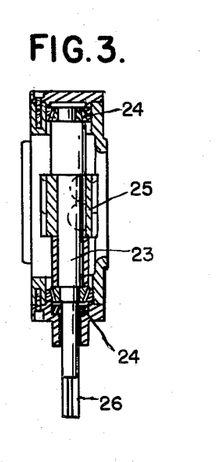
Figs. 3 and 4 are views in section along the lines 3—3 and 4—4, respectively, of Fig. 2.
Figure 4:
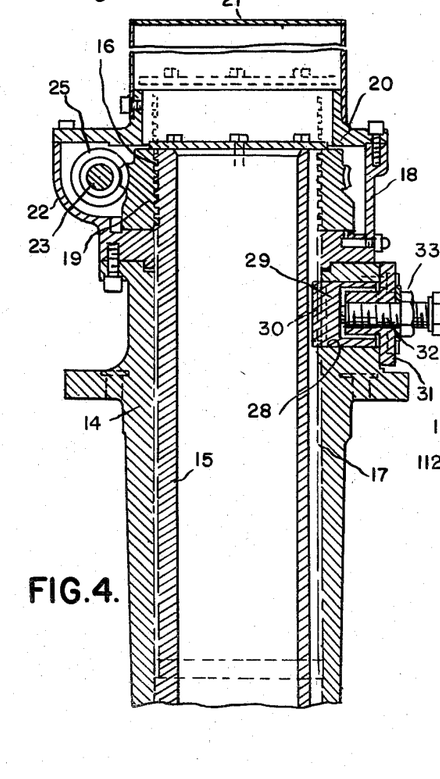

An apertured and flanged cap or ring 20 is bolted onto the top of gear housing 18, the axial opening thereof being coaxial with and of sufficient size to receive the column 15 in an elevated position of the latter; and a cylindrical casing 21 is applied to the ring or cap 20 as a safety and protective shield for the movable column. This casing is of sufficient axial length to receive the column in any elevated position thereof.

The gear housing 18 is provided with a lateral enlargement at 22, and a worm shaft 23 is rotatably mounted adjacent its ends in this housing extension or enlargement 22, as by means of suitable bearings 24. A worm 25 is fixed on the shaft 23 in meshing engagement with the worm gear 19 on tubular column 15, so that rotation of worm 25, as by a suitable wrench applied to the squared end 26 of worm shaft 23 results in axial movement in one direction or the other of the column 15, which is retrained from rotation by provisions to be described.

To the last mentioned end, the shaft housing 14 is laterally apertured at 28 to receive a locking key 29. Key 29 is provided with a truncated tapered nose 30, of the outline indicated in Figs. 2 and 4, which nose is matingly received in the V-shaped spline slot 17 of tubular column 15.

A flanged nut member 31 of axially hollowed cross section is bolted or otherwise fixedly attached to the shaft housing 14, outwardly of the key opening 28 in the latter, this nut being received in housing aperture 28 and threadedly receiving a lock bolt 32. The inner ends of the nut 31 and bolt 32 are received within the hollow axial interior of key 29, the bolt 32 bearing against the key as shown in Fig. 4; and a lock nut 33 is applied to the bolt.

Thus, not only does the key 29 restrain rotation of the tubular column 15, it also serves as a clamp to lock the column in any adjusted axial position relative to the work piece. The vertical bodily adjustment of column 15 is for the purpose of making a proper major adjustment of the column and the buffing head thereon, generally designated 35, relative to the work. Further vertical adjusting provision to be described may be resorted to to accomplish a finer or more accurate positioning of the buffing head relative to the work, as well as to enable a vertical take-up of the buffing head relative to the work as the buffing wheel diminishes in diameter due to wear.

While an overhead support for the tubular column 14 is illustrated and described, it is to be understood that the buffing head 35, and its improved universal mounting provisions according to the invention, may also be carried on a suitable floor support or standard, in accordance with conventional procedure. The overhead arrangement conserves floor space and make it possible to have access to the adjusting provisions conveniently from all sides of the apparatus.

The buffing head 35 of the machine is best shown in Figs. 5 through 9 of the drawings, taken in conjunction with Fig. 1. Means are provided to adjust this head vertically and angularly in several different ways, i.e., bodily and rotatively about the axis of the tubular column 15, vertically upwardly and downwardly bodily in the line of that axis (by the worm 25 and worm gear 19 as described), rotatively about a horizontal axis A—A offset laterally from the axis of column 15, and rotatively about a vertical axis B—B similarly offset and normal to the axis A—A; and improved adjustable rod means position, brace and support the head 35 in any of these universal adjustments.

Figure 5:
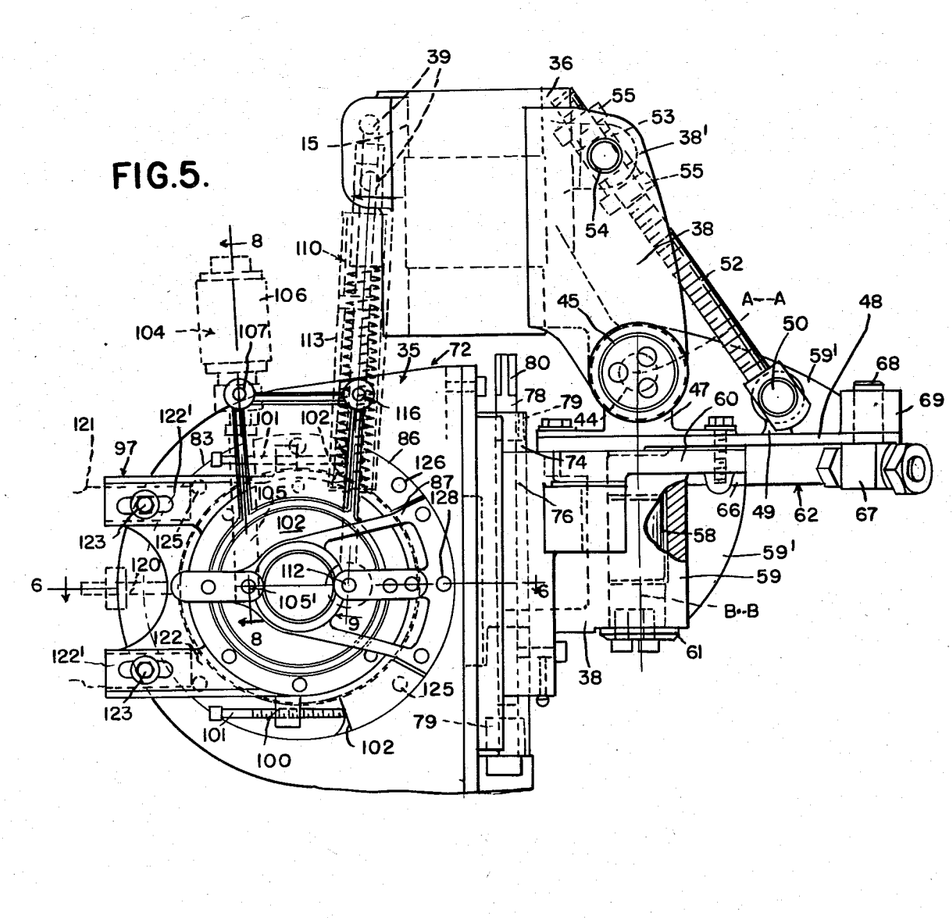
Fig. 5 is a fragmentary view in end elevation, similar to Fig. 1 but in enlarged scale and partially broken away and vertically sectioned, of the adjustable wheel head supporting provisions according to the invention.

In order to sustain head 35 on column 15, a tubular split sleeve or clamp collar 36 surrounds the lower end of column 15, resting upon an end plate 37 bolted to the bottom of the column. The collar 36 carries a laterally projecting, preferably integral bracket 38, by which the head 35 and the remainder of the adjusting mechanism (to be described) are supported; and all of this structure may be rotated 360° bodily and as a unit about the axis of column 15 by simply loosening a pair of lock bolts 39 which clamp the collar 36 to column 15, swinging the collar to the desired angular adjustment, then taking up the bolts 39.

The bracket 38 is a heavy one, braced on its outer surface by a pair of integral arcuate ribs 41 (Fig. 7), and has a tubular boss 42 at its lower end. Boss 42 has spaced coaxial and cylindrical bores 43 which pivotally receive a stub shaft 44 for adjusting rotation within boss 42; and the axis A—A is the axis of adjusting pivot shaft 44. Suitable restraining rings 45 prevent axial movement of adjusting pivot shaft 44 relative to the bracket 38.

Figure 6:
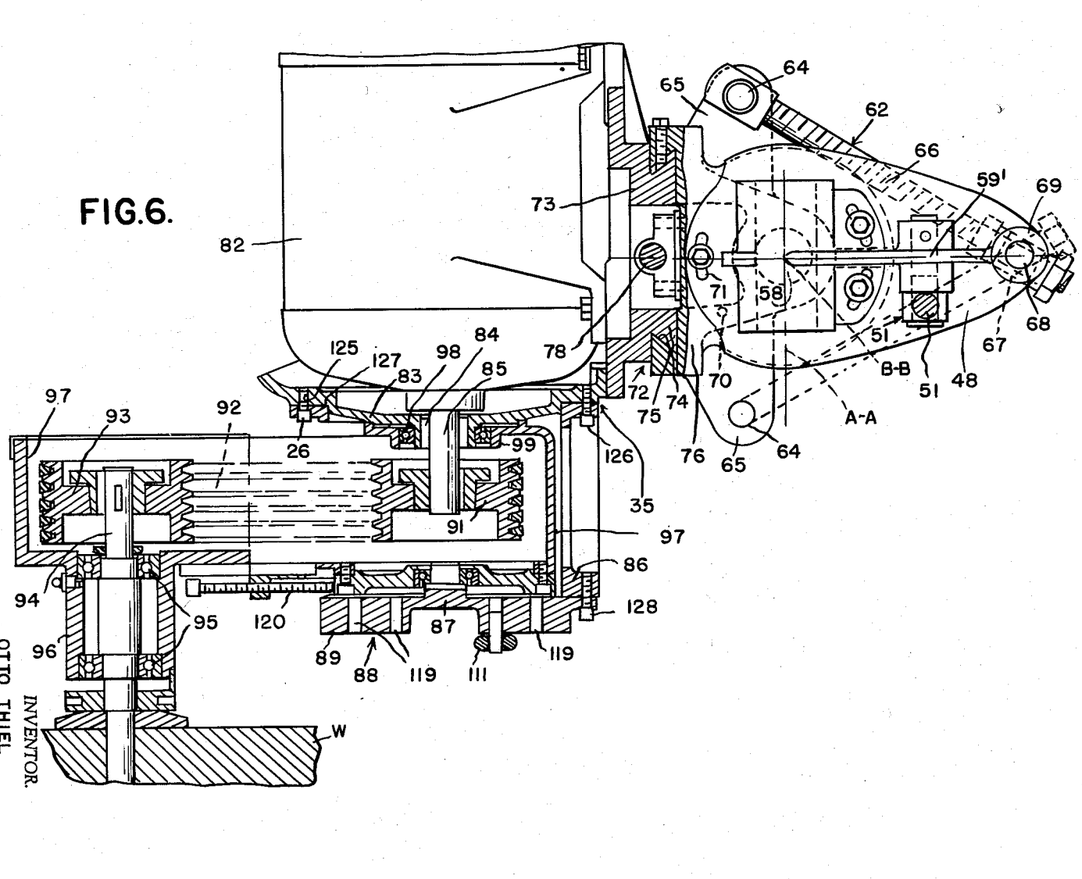
Fig. 6 is a top plan view of the head supporting mechanism, partially broken away and in horizontal section along line 6—6 of Fig. 5, with the position of the overhead supporting column indicated in dot-dash line.

The shaft 44 extends substantially axially and laterally beyond the innermost retaining ring 45, where it rotatively receives an apertured hub or boss 46 on an upright bracket 47 of a laterally extending mounting plate 48, which is of the arcuate marginal outline illustrated in Fig. 6. Outwardly of bracket 47, the plate 48 has a further smaller bracket 49 on its upper surface spaced outwardly of shaft 44 and horizontal axis A—A, which bracket 49 receives a pin 50 paralleling axis A—A and serving as a pivot for an upwardly inclined adjusting rod device 51. The device 51 includes a rigid elongated and threaded rod 52 which is threadedly received at its upper end in a swivel member 53. Member 53 is pivoted by a pin 54 on one of two enlarged bosses 38 integral with the supporting bracket 38 of the column engaging collar 36.

Two nuts 55 are threaded on rod 52, one on either side of the swivel member 53, and loosening of one or the other thereof will permit the mounting plate 48 to be properly adjusted in any desired angular position about the axis A—A, and upon retightening of the nut to be braced rigidly in this adjustable position.

Figure 7:
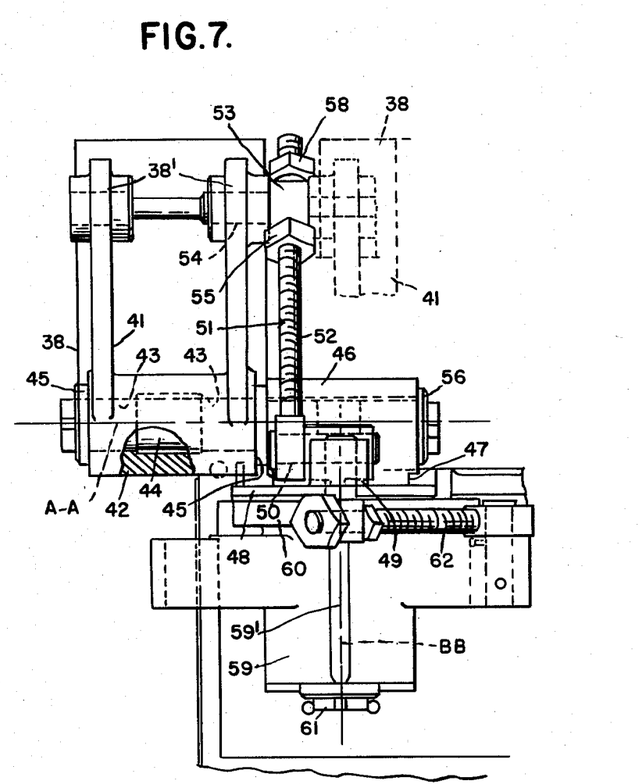
Fig. 7 is an elevational view, partially broken away and in vertical section, of the adjustable head supporting structure, as seen from the right of Fig. 5.
Figure 8:
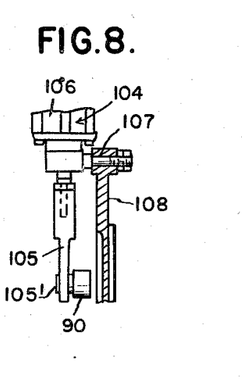
Figs. 8 and 9 are, respectively, fragmentary views in section along lines 8—8 and 9—9 of Fig. 5.

It will also be seen by reference to Fig. 7, that the bracket 38 may be disposed on either side of the swivel member 53, depending upon its adjusted position about the vertical axis B—B, as indicated in solid and dotted line in Fig. 7, which adjustment about a vertical axis is accomplished by the provisions to be described. A retaining ring or washer 56 prevents endwise movement of the adjusting pivot shaft 44 and bracket 38 relative to the boss 46 of horizontal mounting plate 48.

As best shown in Fig. 5 of the drawings, the plate 48 has a depending, preferably integral pivot stem or shaft 58. This shaft rotatively receives the axially elongated hub 59 of a further bracket plate 60, which is rigidified by an integral rib 59', and upon which the buffing head 35 is mounted by still further adjustable slide means, to be described. A suitable disk or cap 61 applied to the end of pivot shaft 58 bears against the lower end of hub 59 to restrain relative axial movement. The axis B—B is the axis of the pivot shaft 58.

An adjusting and locking rod device 62, in all respects similar to the vertical adjusting device 51, save for the fact that it is disposed in a horizontal plane, is provided beneath the arcuate mounting plate 48 for coaction with the bracket plate 60 in adjusting and bracing the latter. To this end, the horizontal adjusting rod device 62 has an end of its threaded rod 66 pivotally mounted by means of a pin 64 (Figs. 6 and 7) to one of two opposed flanged ears 65 of the bracket plate 60 which are equally spaced outwardly from shaft 58 and vertical axis B—B; and the opposite end of threaded rod 66 extends through a swivel member 67.

The member 67 is pivoted by a pin 68 in an axially apertured boss 69 at the outer end of the plate 48, outwardly of and paralleling vertical axis B—B, and it is seen that with the parts as depicted in Fig. 5 the device 62 affords a horizontal pivotal adjustment for bracket plate 60 similar to the vertical pivotal adjustment for mounting plate 48 afforded by the upwardly inclined rod device 51. It is further seen that the connections of devices 51 and 62 may be made in accordance with optional 180° adjusted positions of bracket and mounting plates 48 and 60, reference being had to the solid and dotted line positions of the devices in Figs. 6 and 7 of the drawings.

Bracket plate 60 is provided with a circular series of equally spaced vertical holes 70, and the mounting plate 48 is provided with a set of arcuate slotted openings 71, enabling a further clamped lock-up in any desired position of angular adjustment within the respective limits of two 180° settings of plate 60 about axis B—B; and in any setting of the plate 48 about axis A—A.

The reference numeral 72 generally designates a vertically adjustable slide device by which the buffing head 35 may be adjustable vertically to and from the work, and this is one of the further important features of the invention.

As best shown in Figs. 5 and 6 of the drawings, the slide device 72 includes a slide plate or member 73 mounted on an inner side of the buffing head 35, and provided with a vertically elongated way portion 74. The way 74 dovetails into a vertically elongated way 75 in a slide portion 76 of the bracket plate 60, preferably integral with the latter.

A vertical adjusting screw 78 is appropriately journalled at 79 adjacent opposite ends of the head slide member 73; and this screw is threadedly received in a projecting nut portion 79 on the slide way 76 of bracket plate 60. The upper end of adjusting screw 78 is provided, above the head and bracket parts, with a squared extremity 80, which may receive a suitable hand wrench to rotate the screw in either direction, thus to raise and lower member 73 and head 35. In the alternative, it may have applied thereto a motor-actuated adapter device in accordance with what is illustrated and described in the copending application of John Ross, Serial No. 754,269, filed August 11, 1958, and entitled "Automatic Timing and Indexing Mechanism for Wheel Wear Adjustment."

In any event, suitable provision is made to prevent end movement of the vertical adjusting screw 78 relative to the head 35, and the threaded adjustment shifts the head linearly, always in a direction to and from the work, and regardless of the bodily adjusted position of the head 35 relative to the axis of column 15 or in relation to either of the axes A—A or B—B, both.

The slide member 73 of the buffing wheel head 35 supports an electrical drive motor 82 in a rugged fashion, from which motor the buffing wheel W of the equipment (Figs. 10-12) is driven in a manner to be described.

For the support of the motor and wheel, an appropriate cast cradle bracket 83 is provided, with bolts or other suitable means to secure it rigidly to the outer side of the slide member 73, i.e., opposite the dovetail portion 74 of the latter, so that the motor and its associated parts, such as a spindle and belt housing to be described, move bodily with slide 73. Similar cradle or equivalent provisions are made to mount the opposite end of the motor in fixed relation to slide 73.

The cradle 83 is centrally apertured at 84 to receive the shaft 85 of motor 82, and further bracket castings 86 and 87 are bolted to the cradle casting 83 to constitute a fixed housing bracket, generally designated 88, which moves bodily with the slide. The casting 87 is provided with a pair of spaced bosses 89, 90 for a purpose to be described; and castings 86, 87 are associated with the cradle casting in a way to enable a 360° pivotal adjustment and lock-up of the mount for wheel W about the axis of its drive motor 82, as will also be described.

A multiple sheave pulley 91 is secured on the outer end of motor shaft 85 and is drivingly connected by a plurality of belts 92 with a further multiple sheave pulley 93 fixed onto a wheel drive shaft or spindle 94, to which the wheel W is appropriately secured.

As shown in Fig. 6, spindle 94 is journalled by spaced ball bearings 95 in an axially extending hub 96 of an elongated two-part belt and pulley housing 97; and at the opposite end of the housing 97, i.e., adjacent the motor shaft pulley 91, the housing is rotatably mounted by a ball bearing 98 on an axially outwardly flanged portion 99 of the cradle member 83. This enables the belt housing 97 to float rotatably relative to the cradle and drive motor 82; and to limit the extent of this floating motion the housing 97 is provided with diametrically opposed apertured lugs 100 in which set screws 101 are threadedly engaged. The ends of these screws are adapted to engage against adjacent top and bottom abutment surfaces 102 of the fixed housing bracket member 86, as illustrated in Fig. 5 of the drawings.

Figure 10A:
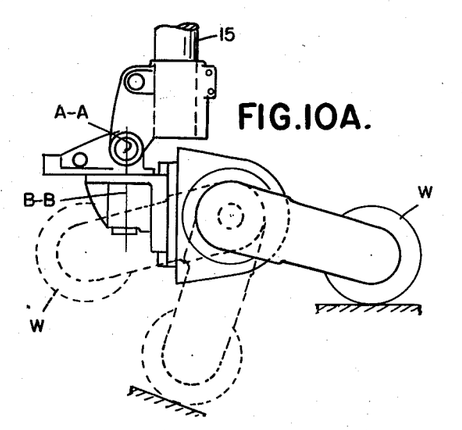
Figs. 10A, 11A and 12A are schematic elevational views showing various optional adjustments of the buffing wheel head to adapt the buffing machine for operations on work positioned in various ways.
Figures 11A, 11B:
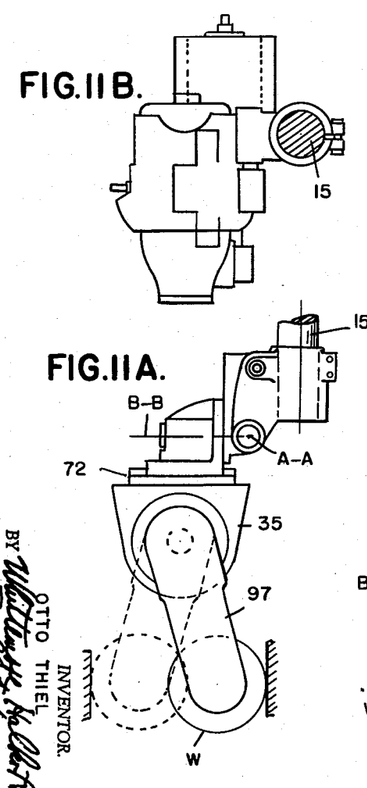

Bracket members 86 and 87 are mounted for 360° adjustment as a unit on cradle 83 and about the axis of motor shaft 85, by means to be described; and to be locked up with the housing 97 in any desired position in this adjustment arc, as shown in Figs. 10A and 11A of the drawings.

Figure 9:
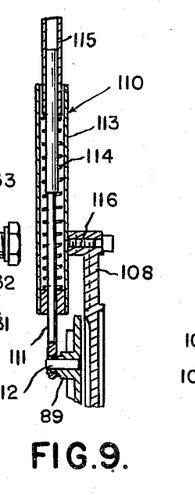

Referring now to Fig. 9 in conjunction with Fig. 5, and 6, there is shown an air cylinder device 104 having an internal axial plunger extension 105 anchored by a pin 105' at its lower end to the fixed housing bracket 88, as at the enlarged boss 90 of the latter. An outer cylinder member 106 of the air cylinder device 104 is connected at 107 to an upright bracket extension 108 on the floating belt and pulley housing 97.

The purpose of the optional air cylinder 104 is to enable the housing 97 and the pulley and belt driven buffing wheel W to be moved as desired during a buffing operation, as for example, in lifting the wheel W away from the work when an indexing movement of the work relative to an area over the wheel is desired. To this end, the air cylinder will be controlled by appropriate valving (not shown) to permit the desired buffing wheel movement about the axis of the motor shaft 85. The pivotal connection of rod 105 to fixed bracket member 87 is an abutment anchoring the air cylinder device 104, its cylinder 106 lifting and lowering the belt housing 97.

Referring now to Fig. 9 in conjunction with Fig. 5, there is shown an optional spring device, generally designated 110, the function of which is to either counterbalance a part of the weight of the belt and pulley housing 97, wheel W and associated parts, or to apply pressure to urge the wheel against the work.

Spring device 110 includes an elongated rod 111 pivotally connected and anchored at its lower end, as by means of a pin 112, to the fixed housing bracket 87, i.e., at the other enlarged boss 89 of the latter. Rod 111 is slidingly received in an elongated tube 113, and a spring 114 within this tube acts axially between it and the enlarged sleeve member 115 on the rod 111. Spring tube 113 is pivotally connected by a pin 116 to the integral upright extension 108 of belt housing 97, at a point spaced from the pivot 107 of air cylinder device 104 thereto. Thus, depending upon the position of the buffing wheel head 35 relative to the work, the spring device 110 may be connected to either urge the wheel W against the work, or to counter-balance its weight in part.

It will be noted by reference to Fig. 6 that the housing bosses 89 and 90 are each provided with a pair of openings 119 to receive the respective lower pivot connections 105 and 112 for the air cylinder 104 and spring device 110. This permits an optional adjustment of the anchoring means for the respective parts.

Set screw means 120 is provided to adjust the tension of the belts. To this end, the belt pulley housing 97, previously indicated to be of two-part construction, may be in the form of slidably associated parts 121, 122, the latter pivoted on cradle 83 and bracket member 87 by bearings 98. The other, outer housing part 121 is slidably guided in bracket arm extensions 122' of the part 122; and the set screw 120 acts between the same to enable belt tension to be adjusted. Suitable bolt and slot means 123 are provided on the relatively slidable belt housing parts to lock them in a desired adjustment.

Mention has been made of a still further 360° rotative adjustment of housing 97 and the wheel, belts and pulleys carried thereby. To this end (Fig. 6) the fixed cradle bracket 83 of head 35 is provided with a circular series of equally spaced holes 125 selectively and threadedly receiving bolts 126 which are applied to a similar series of holes in the annular flange 127 of the intermediate housing bracket 86. The segmental shaped outer bracket 87 is secured by three bolts 128. Thus, removal of the bolts enables the brackets 86, 87 to be swung as a unit with associated air cylinder and spring devices 104, 110 about the axis of motor 82, for a 360° adjustment of the bracket and belt and pulley housing structure about this axis.

Figs. 10A and B, 11A and B, and 12A and B illustrate the versatility and universality of adjustment made possible by the provisions of the invention. In all of these figures, the buffing head 35 is vertically adjustable by bodily movement with the spindle 15 to which it is clamped by the sleeve or collar 36. It is also rotatable adjustably 360° at the collar 36 about the axis of the column 15.

Figure 10B:
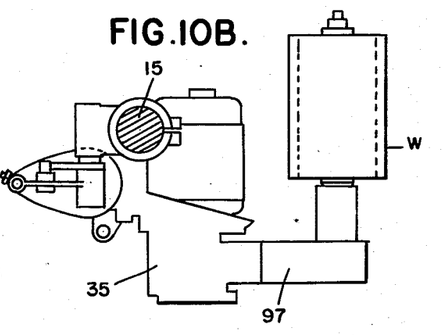
Figs. 10B, 11B and 12B are, respectively schematic top plan views of these optional arrangements.

Fig. 10A shows the position of the head 35 and wheel W which corresponds to that depicted in Figs. 1 and 5 of the drawings. Head 35, bracket plate 60 and mounting plate 48 are swung about upright axis B—B to a position in which the head and wheel W extend to the right, as shown in solid line, and the dotted line positions indicate what can be done by an adjustment of the belt housing 97 and wheel W bodily about the motor axis. Fig. 10B is a plan view showing this setting with a shaft of the wheel W extending in the direction of the motor 83.

Fig. 11A shows another setting of the head 35, in which it and all associated parts, as adjusted about axis B—B in the manner of Fig. 10A, are swung 90° clockwise about the horizontal axis A—A from their position of Fig. 10A. Intermediate positions of the buffing wheel W in this setting are possible as shown in solid and dotted line. Fig. 11B is a corresponding plan view.

Figure 12A:
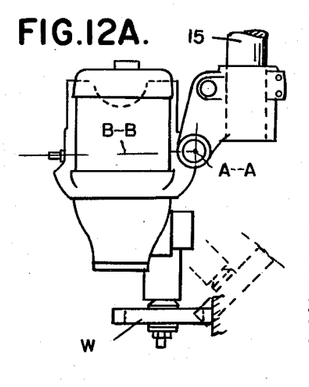
Figure 12B:
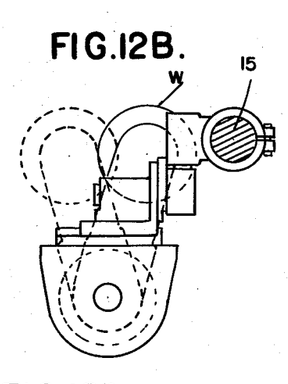

Fig. 12A on the other hand, shows the position of the head and associated parts as again rotated 90° about the axis B—B, compared with the position shown in 11A; Fig. 12B being a plan view showing intermediate angular adjustments about the motor axis in this setting.

In any of the optional locations of the buffing wheel head in relation to its column support, it should be noted that a longitudinal adjustment to take up for wear on buff wheel W is available by manipulation of the slide screw 78, which adjustment is always in the direction to or from the work.

What I claim as my invention is:

1. Structure for the mounting of a buffing or like head for universal adjustment, comprising a support, a first mounting member having means to engage the same with said support for adjustment thereon, a second mounting member having means pivotally engaging said first mounting member for rotatively adjusting it about a first axis, a third mounting member having means pivotally engaging said second mounting member for rotatively adjusting the third mounting member about a second axis in 90° angular relation to said first axis, means to secure said second mounting member in rotatively adjusted position on said first member and said third member in rotatively adjusted position on said second member, comprising rods extending angularly relative to said respective first and second axes and having means to secure the same pivotally at ends of the rods to said respective second and third members on pivotal axes offset from and paralleling said first and second axes, respectively, and means to connect said head to said third mounting member.

2. Structure for the mounting of a buffing or like head for universal adjustment, comprising a support, a first mounting member having means to engage the same with said support for rotative adjustment thereon, a second mounting member having means pivotally engaging said first mounting member for rotatively adjusting it about a first axis laterally offset from and in predetermined angular relation to the axis of adjustment of said first member, a third mounting member having means pivotally engaging said second mounting member for rotatively adjusting the third mounting member about a second axis in 90° angular relation to said first axis, means to secure said second mounting member in rotatively adjusted position on said first member and said third member in rotatively adjusted position on said second member, comprising rods extending angularly relative to said respective first and second axes and having means to secure the same pivotally at ends of the rods to said respective second and third members on pivotal axes offset from and paralleling said first and second axes, respectively and means to adjustably connect said head to said third mounting member.

3. Structure for the mounting of a buffing or like head for universal adjustment, comprising a support, a first mounting member having means to engage the same with said support for rotative adjustment thereon, a second mounting member having means pivotally engaging said first mounting member for rotatively adjusting it about a first axis laterally offset from and in 90° angular relation to the axis of adjustment of said first member, a third mounting member having means pivotally engaging said second mounting member for rotatively adjusting the third mounting member about a second axis in 90° angular relation to said first axis, means to secure said second mounting member in rotatively adjusted position on said first member and said third member in rotatively adjusted position on said second member, comprising rods extending angularly relative to said respective first and second axes and having means to secure the same pivotally at ends of the rods to said respective second and third members on pivotal axes offset from and paralleling said first and second axes, respectively, and means to adjustably connect said head to said third mounting member.

4. Structure for the mounting of a buffing or like head for universal adjustment, comprising a support having means to adjust the same vertically, a first mounting member having means to engage the same with said support for rotative adjustment thereon, a second mounting member having means pivotally engaging said first mounting member for rotatively adjusting it about a first axis laterally offset from and in 90° angular relation to the axis of adjustment of said first member, a third mounting member having means pivotally engaging said second mounting member for rotatively adjusting the third mounting member about a second axis in 90° angular relation to said first axis, means to secure said second mounting member in rotatively adjusted position on said first member and said third member in rotatively adjusted position on said second member, comprising rods extending angularly relative to said respective first and second axes and having means to secure the same pivotally at ends of the rods to said respective second and third members on pivotal axes offset from and paralleling said first and second axes, respectively, and means to adjustably connect said head to said third mounting member.

5. Structure for the mounting of a buffing or like head for universal adjustment, comprising a support, a first mounting member having means to engage the same with said support for adjustment thereon, a second mounting member having means pivotally engaging said first mounting member for rotatively adjusting it about a first axis laterally offset from and in 90° angular relation to the axis of adjustment of said first member, a third mounting member having means pivotally engaging said second mounting member for rotatively adjusting the third mounting member about a second axis in 90° angular relation to said first axis, means to secure said second mounting member in rotatively adjusted position on said first member and said third member in rotatively adjusted position on said second member, comprising rods extending angularly relative to said respective first and second axes and having means to secure the same pivotally at ends of the rods to said respective second and third members on pivotal axes offset from and paralleling said first and second axes, respectively, and means to adjustably connect said head to said third mounting member, one of said second and third mounting members having means to selectively pivot an end of one of said rods on two axes spaced from and paralleling one of said first and second axes.

6. Structure for the mounting of a buffing or like head for universal adjustment, comprising a support having means to adjust the same vertically, a first mounting member having means to engage the same with said support for rotative adjustment thereon, a second mounting member having means pivotally engaging said first mounting member for rotatively adjusting it about a first axis laterally offset from and in 90° angular relation to the axis of adjustment of said first member, a third mounting member having means pivotally engaging said second mounting member for rotatively adjusting the third mounting member about a second axis in 90° angular relation to said first axis, means to secure said second mounting member in rotatively adjusted position on said first member and said third member in rotatively adjusted position on said second member, comprising rods extending angularly relative to said respective first and second axes and having means to secure the same pivotally at ends of the rods to said respective second and third members on pivotal axes offset from and paralleling said first and second axes, respectively, and means to adjustably connect said head to said third mounting member, including means to adjust said head longitudinally of said third member in a line paralleling said second axis, one of said second and third mounting members having means to selectively pivot an end of one of said rods on two axes spaced from and paralleling one of said first and second axes.

7. Mounting structure in accordance with claim 6, in which the axis of rotative adjustment of said first member on said support is vertical.

8. Mounting structure in accordance with claim 6, in which the axis of rotative adjustment of said first member on said support is vertical and its rotative adjustment is a 360° one.

9. Mounting structure in accordance with claim 6, in which the axis of rotative adjustment of said first member on said support is vertical, and in which said first axis for the rotative adjustment of said second mounting member is horizontal.

10. Structure for the mounting of a buffing or like head for universal adjustment, comprising a support, a first mounting member on said support, a second mounting member having means pivotally engaging said first mounting member for rotatively adjusting it about a first axis, a third mounting member having means pivotally engaging said second mounting member for rotatively adjusting the third mounting member about a second axis in 90° angular relation to said first axis, means to secure said second mounting member in rotatively adjusted position on said first member and said third member in rotatively adjusted position on said second member, comprising rods extending angularly relative to said respective first and second axes and having means to secure the same pivotally at ends of the rods to said respective second and third members on pivotal axes offset from and paralleling said first and second axes, respectively, and means to connect said head to said third mounting member.

References Cited in the file of this patent

UNITED STATES PATENTS

| | | |
|---|---|---|
| 1,674,669 | Steadman | June 26, 1928 |
| 1,800,307 | Marschke et al. | Apr. 14, 1931 |
| 2,106,082 | Carlson | Jan. 18, 1938 |
| 2,117,637 | Walling | May 17, 1938 |
| 2,281,353 | Hubbard | Apr. 28, 1942 |
| 2,435,622 | Fielding | Feb. 10, 1948 |
| 2,655,768 | Bartell | Oct. 20, 1953 |